United States Patent [19] [11] 3,929,892
Hynes et al. [45] Dec. 30, 1975

[54] PREPARATION OF A LOW FAT CREAM CHEESE PRODUCT

[75] Inventors: John T. Hynes, Glenview, Ill.; Demetrius G. Vakaleris, Lima, Ohio

[73] Assignee: Kraftco Corporation, Glenview, Ill.

[22] Filed: May 29, 1974

[21] Appl. No.: 474,175

Related U.S. Application Data

[63] Continuation-in-part of Ser. No. 311,315, Dec. 1, 1972, abandoned, which is a continuation-in-part of Ser. No. 74,937, July 23, 1970, abandoned.

[52] U.S. Cl. .................. 426/582; 426/36; 426/519; 426/585
[51] Int. Cl.² .................. A23C 19/00; A23C 19/12
[58] Field of Search .......... 426/185, 188, 356, 361, 426/36, 357, 40, 519, 580, 582, 585

[56] References Cited
UNITED STATES PATENTS

| | | | |
|---|---|---|---|
| 2,098,764 | 11/1937 | Sharpless | 426/36 |
| 2,160,159 | 5/1939 | Lundstedt et al. | 426/40 |
| 2,224,720 | 12/1940 | Butterworth et al. | 426/357 |

OTHER PUBLICATIONS
Kosikowski, F., Cheese and Fermented Milk Foods, Published by the Author, Cornell University, Ithaca, N.Y., 1966 (pp. 133, 134, 137–140, 296, 300 & 302).

*Primary Examiner*—David M. Naff
*Attorney, Agent, or Firm*—Fitch, Even, Tabin & Luedeka

[57] ABSTRACT

A cheese product which resembles Cream cheese in body and texture but which has a lower fat content and a method for the manufacture thereof are provided. In the method a mix is prepared from dairy ingredients which include Cottage cheese curd, non-fat milk solids and a fat source. The curd and/or non-fat milk solids provide casein combined with heat denatured serum protein in sufficient amount to provide the desired body and texture. The mix is heated to a temperature sufficient to provide a fluid consistency. Thereafter, an edible acid is added to the heated mix at a level sufficient to establish a preselected pH in the mix. The mix is then homogenized at a pressure to provide the desired body and texture and is packaged.

9 Claims, No Drawings

PREPARATION OF A LOW FAT CREAM CHEESE PRODUCT

The present invention is a continuation-in-part of application Ser. No. 311,315, filed December 1, 1972, which application is a continuation-in-part of application Ser. No. 74,937, filed Sept. 23, 1970, both now abandoned.

The present invention relates generally to soft, mild uncured cheese product which resembles Cream cheese but which has a reduced level of fat.

Cream cheese and Neufchatel cheese are two varities of soft, mild, uncured cheese of well-recognized texture and body characteristics which may be used as a spread for bread, in sandwiches, and with salads and the like. Neufchatel cheese may be cured. Neufchatel cheese is similar to Cream cheese but has a lower fat content. The fat content of Cream cheese is from at least about 33 percent to about 38 percent. The fat content of Neufchatel cheese is from at least about 20 percent to about 33 percent. Neufchatel cheese is higher in moisture than Cream cheese.

Cream cheese is prepared from a standardized Cream cheese mix having a butterfat concentration of from about 10 percent to about 20 percent. Neufchatel cheese may be prepared from whole milk, having a butterfat concentration of about 3.5 percent, or may be prepared from standarized mixes having butterfat concentrations of up to about 10 percent. As used herein, all concentrations are by weight of the indicated product unless otherwise indicated.

The method of making Cream cheese varies somewhat in different factories, but usually includes the following general steps:

A Cream cheese mix is prepared which has a butterfat content of from about 10 percent to about 14 percent. Sweet whole milk or skim milk and sweet cream are blended in suitable proportions to form the Cream cheese mix. The Cream cheese mix is pasteurized and homogenized, after which it is cooled, usually to a temperature between 62°F and 90°F, and is inoculated with lactic acid-producing culture, with or without rennet. The mix is held until it has ripened so as to form a coagulum. When the acidity of the coagulum reaches about 0.6 percent to about 0.9 percent (expressed as equivalent percent lactic acid) the coagulum is broken by agitation to form curd and whey. The curd is then heated in the whey with stirring to a temperature of about 115°F to about 130°F to promote expulsion of whey from the curd. The curd is then separated from the whey. The ripened mix may be heated to an elevated temperature sufficient to break the viscosity, whereupon curd may be centrifugally separated from whey at the elevated temperature.

The method of making Neufchatel cheese from mixes containing less than 10 percent butterfat usually differs from the method of making Cream cheese from mixes containing more than 10 percent butterfat, in that the coagulum is not broken by agitation and the ripened mix is not subjected to heating. When a coagulum is formed from mixes containing less than about 10 percent fat, heating of the coagulum to aid in the expulsion of whey is usually not feasible, since the curd toughens and provides a grainy or sandy effect in the finished cheese product.

It would be desirable to provide a product having the body and texture characteristics of Cream cheese or Neufchatel cheese but which has less fat. It would also be desirable to provide a method for making such product wherein the cheese may be heat treated prior to packaging so as to promote extended shelf life. It would be further desirable to provide a product having the consistency and texture of Cream cheese and containing a level of fat below that of Neufchatel cheese, i.e., less than about 20 percent fat.

Accordingly, it is an object of the present invention to provide a cheese product having the body and texture of Cream cheese but which contains less fat. It is another object of the invention to provide a method for making a product having the body and texture of Cream cheese but which contains less than 33 percent fat. It is a further object of the invention to provide a product having the body and texture of Cream cheese but having less fat than Cream cheese by a method wherein the product can be packaged while hot.

These and other objects of the invention will become more apparent from the following detailed disclosure.

Generally, in a method embodying various of the features of the invention, a mix is provided from water and Cottage cheese curd. The mix is heated and non-fat milk solids and a fat source such as cream, Neufchatel curd and Cream cheese curd are added thereto. The curd, fat source and/or non-fat milk solids provide caseins in combination with denatured serum proteins in sufficient amount to provide the desired body and texture to the cheese product. The desired features of the invention are not obtained with undenatured serum proteins or with denatured serum proteins when uncombined with caseins. The unique features of the invention require the combination of caseins with denatured serum proteins, which combination is provided by effecting denaturation of serum proteins in the presence of caseins. The mix may be pre-homogenized after addition of the fat source and non-fat milk solids. The ingredients are selected so as to provide a final mix with particular levels of lactose and denatured serum proteins in combination with caseins. The mix is heated to a temperature sufficient to provide a fluid consistency. Thereafter, an edible acid is added to the heated mix at a level sufficient to establish a pre-selected pH in the mix. The mix is then homogenized at a particular pressure so as to establish a desired body and texture, and is packaged to provide a low fat Cream cheese type product.

As can be seen from the above general description of the process of the invention, there is no whey separation step in preparing the low fat Cream cheese-like product of the invention. Therefore, the components of the mix are selected so as to provide the desired level of moisture, milk protein, fat and salt in the finished product. In particular, the various dairy ingredients are combined at levels to provide a product having a particular level of lactose. The lactose level is from about 4 to about 7 percent by weight of the product. If the lactose level is below about 4 percent, the level of non-fat milk solids used in the product will be too low and the product will have undesirable body and texture. If the lactose level is above about 7 percent, an overly sweet taste is obtained which is undesirable to most consumers. In addition, if the lactose level is above about 7 percent, lactose crystallization on storage may occur and a grainy product may be obtained.

It is contemplated that the method of the invention may be used to provide a cheese product containing as low as 10 percent fat. The fat source may be any edible animal or vegetable fat having physical properties substantially similar to those of milk fat. Preferred fat sources are dairy derived and include Cream cheese curd, Neufchatel curd, cream or combinations thereof. Cream cheese curd and cream usually contain from about 33 percent to about 38 percent fat. Neufchatel curd usually has from about 20 percent to about 33 percent fat. Other suitable fat sources are hydrogenated vegetable oils having a melting point in the range of from about 80°F to about 110°F, as determined by the method of F. Francis, et al., J. Chem. Soc. (1936) pgs. 137-142. Suitable vegetable oils include, but are not limited to, coconut oil, soy bean oil, cottonseed oil, corn oil, peanut oil and safflower oil.

The method of the invention may be used to produce Cream cheese-like products having fat levels of from about 10 percent up to and including levels of fat associated with Neufchatel cheese, i.e., from about 10 percent to about 33 percent fat. However, the method of the invention becomes uneconomical in comparison with conventional Neufchatel cheese make methods when it is used to provide Cream cheese type products at fat levels above about 20 percent by weight. Therefore, the fat source will not provide levels above those required to provide 20 percent fat in the mix.

It will be readily apparent to one skilled in the art that there are significant differences in the properties of the respective dairy derived fat sources of the invention. These differences include differing fat levels, particularly between the cream or Cream cheese curd and the Neufchatel curd, a difference in level of acidity between cream and Cream cheese curd or Neufchatel curd, and the differences in body and texture between each of the fat sources. Consequently, it has been found that for each of the respective fat sources there are optimum levels of the fat source that may be established in the finished cheese product. Also, the useful range of levels for each of the other components of the cheese product is dependent upon the fat source. The relationship of these variables is set forth below in Table I. It should be understood, however, that the fat sources of the invention may be, and sometimes preferably are, used in combination. The range of levels of the components in Table I are, therefore, only illustrative of particular conditions of the invention and should not be considered restrictive.

TABLE I

| Ingredients | Range of Levels of Use-Weight Percent Fat Source | | |
| --- | --- | --- | --- |
| | Cream | Cream cheese curd | Neufchatel cheese curd |
| Non-Fat Milk Solids | 5-15 | 5-15 | 5-15 |
| Cottage Cheese Curd | 35-65 | 20-40 | 15-35 |
| Water | 7-25 | 12-22 | 3-15 |
| Fat Source | 25-50 | 30-60 | 45-70 |
| Salt (NaCl) | .5-1.5 | .5-1.5 | .5-1.5 |
| Optimum level of fat in finished product | 10-20 | 10-20 | 10-15 |

As used herein, the term "cottage cheese curd" refers to a drained, uncreamed cheese curd which is predominently casein and which is prepared by any known make procedure from skim milk. Cottage cheese curd usually comprises about 75-80 percent moisture, and about 20 to 25 percent milk solids non-fat. The level of addition of the Cottage cheese curd is, of course, dependent upon the level of fat desired in the finished product and the level of addition of the fat source. In general, the Cottage cheese curd will be added at levels of from about 20 percent to about 65 percent.

The level of dried non-fat milk solids which is added is selected so as to provide the desired total level of non-fat milk solids in the finished product and the desired level of lactose. In general, it is not possible to add skim mhkk solids at levels above about 15.0 percent. At levels above about 15.0 percent it becomes difficult to hydrate the dry non-fat milk solids. Any source of dry non-fat milk solids may be used such as skim milk solids, caseins or caseinates, or combinations thereof. Whey or modified whey may be used as a partial source of non-fat milk solids. When whey is used as a partial source of non-fat milk solids it is preferred to use the whey at levels below about 4.0 percent by weight of the finished product to avoid imparting an off flavor. The preferred source of non-fat milk solids is dried skim milk.

The method of the invention may be used in general to provide cheese products having the following components at the indicated range of levels:

| Ingredient | Weight Percent |
| --- | --- |
| Total non-fat milk solids | 10-25 |
| Fat | 10-15 |
| Moisture | 60-70 |

It will be appreciated by one skilled in the art that the components comprising the mixture of the invention may be varied over a substantial range for each component so as to provide the desired final level of non-fat milk solids, fat, lactose and moisture in the finished product.

Most of the non-fat milk solids of the low fat cheese product of the invention are provided by Cottage cheese curd and by dried skim milk, both of which are derived from skim milk. Non-fat milk solids may also be provided by the fat source and from whey.

It has been determined and is an important feature of the present invention that the non-fat milk solids must be treated to denature at least a portion of the serum proteins in the presence of caseins so that the serum proteins and caseins interact. The cheese product of the invention should comprise at least 4 percent protein in the form of denatured serum proteins in combination with caseins, and may comprise the total level of serum proteins present in milk, i.e., about 22 percent by weight. The level of denatured serum proteins being expressed as a percentage by weight of the total protein in the cheese product.

At low levels of denatured serum proteins, pre-homogenization (discussed more fully hereinafter) and high pressure homogenization are required to provide the desired body and texture. At higher levels of denatured serum proteins, lower homogenization pressure can be used and pre-homogenization is not required.

As used herein, the term "serum proteins" refers to that portion of the total protein of milk which is not casein and which is primarily recovered in normal cheese making processes in the whey. Serum proteins constitutes approximately 0.6 percent of the milk and about 22 percent of the total milk protein. The serum proteins fraction comprises approximately 55 percent β-lactoglobulin, 12 percent α-lactalbumin and 10 percent proteose-peptone. In contrast to caseins, serum proteins in native milk are not soluble at their isoelectric point. However, when serum proteins are denatured, in the presence of caseins, the serum proteins will combine with the caseins and the serum proteins will co-precipitate with caseins.

As used herein the term "denatured serum proteins" refers to serum proteins which has been treated by chemical or physical means in the presence of caseins so as to alter the original state of the serum proteins and cause the serum proteins to interact with the caseins. The preferred means for effecting denaturation of serum proteins is heat treatment.

The denatured serum proteins may be provided by the Cottage cheese curd, the non-fat milk solids, the fat source, or from a combination of these sources of non-fat milk solids. In this connection, skim milk from which the Cottage cheese is made can be heat treated to denature the serum proteins as taught in U.S. Pat. No. 3,039,879 to Vakaleris. Also, the skim milk or the fat source, used which provide additional non-fat milk solids, can be heat treated to denature a portion of the serum proteins. It should be understood, however, that the heat treatment of the skim milk or fat source to effect denaturation of the serum proteins should be effected before the serum proteins are separated from the caseins of the milk protein. That is, the heat denaturation step must take place while the serum proteins are in the presence of the caseins. It is not sufficient to separate serum proteins from caseins, to subsequently heat treat the serum proteins to denature a portion of the serum proteins and to recombine the denatured serum proteins with the caseins to provide non-fat milk solids having denatured serum proteins within the range set forth above.

In the method of preparing the cheese product of the invention, it is desirable to combine the Cottage cheese curd and the water and to heat this mixture prior to addition of the non-fat milk solids and the fat source. This aids in dispersing the non-fat milk solids and the fat source in the water. However, such heating is not essential if a longer mixing period is used.

When heating is effected, the fat source is added at a temperature above that required to melt the fat of the fat source, i.e., above about 110°F. The non-fat milk solids are added slowly as the temperature increases over a range of about 110°F to 140°F to provide a mixture of non-fat milk solids and fat.

When the level of denatured serum proteins is below about 12 percent by weight of the total protein, it is preferred that the mixture of non-fat milk solids and fat is then subjected to a pre-homogenization step.

When the level of denatured serum proteins is above about 12 percent, pre-homogenization is not required but may be used if desired. The use of pre-homogenization when higher levels of denatured serum proteins are present results in lowering the final homogenization pressure required to provide the cheese product of the invention with the desired body and texture.

Pre-homogenization may be effected by passing the mixture through any conventional food homogenization apparatus. Such apparatus includes colloid mills and homogenizers. A colloid mill subjects the mixture to shearing action by passing the mixture between two surfaces that move at high velocity and at close clearance to each other. In an homogenizer, the shearing action is attained by forcing the mixture by pressure through small orifices or between closely clearing but relatively fixed surfaces. The pressure established during the pre-homogenization step is not critical and can be within the range of from about 5 psig to about 5000 psig. A preferred method for effecting pre-homogenization is to pump the mixture of non-fat milk solids and fat through a conduit provided with a valve. The valve is partially closed to establish a back pressure on the mixture as it is pumped through the conduit. The valve is set to establish a back pressure of from about 5 psig to about 75 psig. Any type of positive displacement pump can be used. The selection of a valve is not critical and any type valve may be used which is capable of establishing the desired back pressure. In this connection, gate valves, globe valves, flat seat manual compression valves, needle valves and diaphragm valves can be used. The diameter and shape of the conduit is not critical but is selected in consideration of the type of pump used, the back pressure desired, the flow rate desired and the type of valve used.

It is also usually desirable to add salt, if used, and a gum, if used, after the mixture has been heated. Suitable gums include carob bean gum, guar gum, karaya, gelatin, carrageenan and carboxymethyl cellulose. Gums, when used, are added at levels of from about 0.25 to about 0.50 percent.

The mixture is then heated to a temperature sufficient to provide a fluid consistency and to effect pasteurization. This temperature is usually in the range of from about 140°F to about 180°F. After the mixture has been heated a suitable edible acid is added to the mixture so as to provide a pH in the mixture of from about 4.3 to about 4.8. Suitable edible acids include, but are not limited to, lactic acid, adipic acid, fumaric acid, glucono delta lactone, gluconic acid and mixtures of these acids. A preferred acid is lactic acid since this is the acid provided by bacterial inoculation of cream in the manufacture of Cream cheese by conventional procedures.

After addition of the acid, the mixture is homogenized at a particular pressure and may be packaged at an elevated temperature. It is generally preferred to package the mixture at a temperature of above about 150°F. Such packaging at elevated temperatures provides an extended shelf life.

It has been determined that the final product firmness is dependent upon the temperature at which the acid is added, the level of addition of the acid (pH), the level of denatured serum proteins, the use of a pre-homogenization step, and the homogenization pressure that is used. The firmness is also somewhat dependent upon the selection of a fat source. In general, it is desirable to provide a product having a firmness corresponding to a penetration value of from about 30 to about 50. The penetration value is the depth of penetration of a penetration assembly (Precision Scientific Co. Catalog No. 73438).

The penetration assembly weighed 47.5 gms. and consisted of a rod having a circular aluminum cone affixed to one end. The cone was 1-⅜ inches in diameter at the base and tapered to a vertex at a angle of 78°. The penetration value is determined by placing the vertex of the cone into contact with the surface of a cheese product maintained at 44°F. At time 0, a trigger is pressed which releases the penetration assembly and starts a stop watch. After a period of 15 seconds has elapsed the trigger is released. This arrests the movement of the penetration assembly and stops the watch. The penetration value is the depth of penetration in 0.1 mm. increments. Cream cheese usually has a penetration of about 38.

Generally, as the temperature at which the acid is added is increased at a constant pH and constant homogenization pressure, the product becomes more firm. As the homogenization pressure is increased at a constant temperature and a constant pH, the product becomes more firm. If the level of denatured serum proteins in combination with the casein is below the indicated range, the cheese product of the invention cannot be made. In this connection, all of the serum proteins of the skim milk used to provide the Cottage cheese and non-fat milk solids could be denatured, but this is usually not feasible. If the pre-homogenization step is not used, a product having the desired level of firmness can be attained by adjusting operating and composition conditions, as described above. However, it is preferred to use a pre-homogenization step.

After the selection of other process conditions and the selection of compositions within the ranges set forth, the homogenization pressure is selected to provide the final firmness desired in the product of the present invention. An homogenization pressure of up to about 10,000 psig may be used under certain circumstances, however equipment for attaining pressures above about 6000 psig is not readily available and is costly. In most circumstances an homogenization pressure of between about 500 psig and about 5000 psig is sufficient. The selection of homogenization pressure is made to provide a final product having a penetration firmness of from about 30 to about 50.

It is also contemplated in the practice of the present invention to provide all or a portion of the fat of the cheese product from suitable edible vegetable oils. When an edible vegetable oil is substituted for all or a portion of the fat of the dairy derived fat sources previously described, an appropriate adjustment of the other ingredients of the cheese product is made. It is not usually desirable to provide more than about half of the fat of the cheese of the invention by vegetable oil, since an undesirable flavor may be encountered.

The following examples further illustrate various features of the invention, but are intended to in no way limit the scope of the invention, which is defined in the appended claims.

EXAMPLE I

The following ingredients are used at the indicated levels to provide a cheese product in accordance with the method of the invention:

| Ingredients | Weight Percent |
| --- | --- |
| Cottage cheese curd | 50.0 |
| Skim milk solids | 5.0 |
| Cream cheese curd | 40.0 |
| Lactic acid (50 percent solution) | Sufficient to provide pH of 4.6 |
| Carob bean gum | .15 |
| Salt (NaCl) | .50 |

The Cottage cheese curd is prepared from skim milk which is heat treated to denature 60 percent of the serum proteins. The skim milk solids are obtained from skim milk which is heat treated in an amount sufficient to denature 20 percent of the serum proteins.

The procedure for making the cheese is as follows: The cottage cheese curd and water are placed in a jacketed kettle and are gradually heated by steam injection, while being stirred, to a temperature of 155°F. The Cream cheese curd and skim milk solids are then added and stirring is continued until the mixture is thoroughly blended. Heating is continued until the mixture reaches a temperature of 175°F. The mixture is then pre-homogenized by pumping the mixture through a 2 inch circular conduit provided with a flat seat manual compression valve. The valve is adjusted to provide a back pressure of 40 psig. At this time the salt and carob bean gum are added and thoroughly blended. Lactic acid is then added at a level sufficient to provide a pH of 4.6. The mixture is then homogenized in a single stage homogenizer at a pressure of 3000 psig. The mixture is then packaged into aluminum tub containers holding 4 ounces of product each while the temperature of the mix is above about 160°F.

The product obtained has the following composition:

| Ingredient | Weight Percent |
| --- | --- |
| Non-fat milk solids | 20.5 |
| Serum proteins denatured in combination with caseins | 5.2 |
| Fat | 13.4 |
| Moisture | 65.00 |
| Salt | .80–1.00 |
| Carob bean gum | .25 |
| pH | 4.6 |

The cheese product has body and texture resembling that of Cream cheese, has a penetration firmness of about 35, and is easily spreadable. The flavor is mild and pleasing and is not readily distinguishable from the flavor of Cream cheese.

EXAMPLE II

Additional cheese products are prepared in accordance with the method of the invention. Each of the cheese products contained cream at a level sufficient to provide 10 percent fat in the cheese product. Each of the samples also contained 42 percent Cottage cheese curd, 13.3 percent skim milk solids, 0.25 percent carob bean gum and 0.90 percent salt. Creamed Cottage cheese is used and the fat present in the creaming mixture is allowed for in adding the cream.

The procedure for making the cheese product is the same as in Example I with the exception that for some of the cheese products there is no pre-homogenization. For other cheese products, pre-homogenization is effected in a single stage homogenizer at a pressure of 1500 psig. The cheese products have various levels of denatured serum proteins. The skim milk used to provide the Cottage cheese and/or the skim milk used to provide the skim milk solids is heat treated to effect denaturation of serum proteins in the presence of caseins. The level of denatured serum protein is set forth below in Table II. Each of the cheese products is acidified at a temperature of about 155°F with lactic acid at a level sufficient to provide a pH of 4.7. Some of the cheese products are homogenized at a pressure of 3500 psig and other cheese products are homogenized at a pressure of 1000 psig.

The firmness of the cheese products as determined by the penetration test previously described is set forth below in Table II.

TABLE II

| Sample No. | Pre-Homogenization psig | Final Homogenization psig | Denatured serum protein - percent by weight of total protein | Penetration value |
| --- | --- | --- | --- | --- |
| 1 | None | 1000 | 0 | Too soft to measure |
| 2 | None | 3500 | 0 | Too soft to measure |
| 3 | 1500 | 1000 | 0 | 95 |
| 4 | 1500 | 3500 | 0 | 72 |
| 5 | None | 1000 | 7.3 | Too soft to measure |
| 6 | None | 3500 | 7.3 | Too soft to measure |
| 7 | 1500 | 1000 | 7.3 | 48 |
| 8 | 1500 | 3500 | 7.3 | 40 |
| 9 | None | 1000 | 11.0 | 68 |
| 10 | None | 3500 | 11.0 | 64 |
| 11 | 1500 | 1000 | 11.0 | 42 |
| 12 | 1500 | 3500 | 11.0 | 38 |
| 13 | None | 1000 | 18.0 | 135 |
| 14 | None | 3500 | 18.0 | 80 |
| 15 | 1500 | 1000 | 18.0 | 51 |
| 16 | 1500 | 3500 | 18.0 | 53 |

Various of the features of the invention are defined in the appended claims.

What is claimed is:

1. A method for making a cheese product having a body and texture similar to that of Cream cheese, but having less fat than Cream cheese, comprising providing a mixture of water and Cottage cheese curd, adding a fat source to said mixture to provide a substrate, adding non-fat milk solids to said substrate, at least about 4 percent to about 22 percent of the protein of said substrate being denatured serum proteins, heating said substrate to a temperature of about 140°F to about 180°F sufficient to provide a fluid mix and to effect pasteurization, adding an edible acid to said heated mixture, and homogenizing said acidified substrate at a pressure sufficient to establish a final product having a penetration firmness within the range of from about 30 to about 50, to provide a cheese product having a body and texture similar to that of Cream cheese, but having less fat than Cream cheese, said Cottage cheese curd being present at a level of from about 15 percent to about 65 percent by weight of said cheese product, said fat source being provided at a level sufficient to establish from about 10 percent to about 20 percent by weight fat in said cheese product, said non-fat milk solids being present at a level of from about 5 percent to about 15 percent by weight of said cheese product, the level of lactose in said cheese product being from about 4 percent to about 7 percent, said acid being added at a level sufficient to establish a pH of from about 4.3 to about 4.8 in said substrate.

2. A method in accordance with claim 1 wherein said mixture of water and Cottage cheese curd are heated prior to adding said fat source and said non-fat milk solids.

3. A method in accordance with claim 1 wherein said fat source is added after the temperature of said mixture is at least about 110°F.

4. A method in accordance with claim 1 wherein said non-fat milk solids are added slowly as the temperature of said mixture of water and Cottage cheese curd is increased within the range of from about 110°F to about 140°F.

5. A method in accordance with claim 1 wherein said substrate is pre-homogenized.

6. A method in accordance with claim 5 wherein said pre-homogenization is at a pressure of from about 5 psig to about 5000 psig.

7. A method in accordance with claim 1 wherein said heating of said substrate is to a temperature in the range of from about 140°F to about 180°F.

8. A method in accordance with claim 1 wherein a gum is added to said mixture, said gum being added at a level of from about 0.25 percent to about 0.50 percent by weight of the cheese product.

9. A method in accordance with claim 8 wherein said gum is selected from the group consisting of carob bean gum, guar gum, karaya, gelatin, carrageenan, and carboxymethyl cellulose.

* * * * *

UNITED STATES PATENT OFFICE
CERTIFICATE OF CORRECTION

Patent No. 3,929,892      Dated December 30, 1975

Inventor(s) John T. Hynes et al.

It is certified that error appears in the above-identified patent and that said Letters Patent are hereby corrected as shown below:

Column 5, line 1, delete "not".

Signed and Sealed this twenty-fifth Day of May 1976

[SEAL]

Attest:

RUTH C. MASON
*Attesting Officer*

C. MARSHALL DANN
*Commissioner of Patents and Trademarks*